Feb. 26, 1952
A. D. ROBINSON
2,587,223
SIGNAL LIGHT FOR FISHING LINES
Filed April 26, 1948
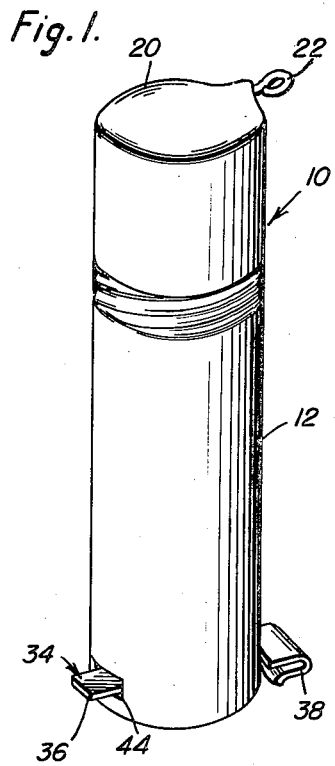
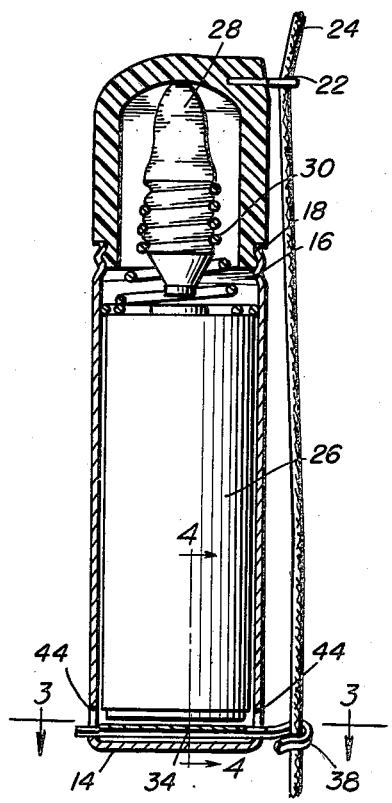
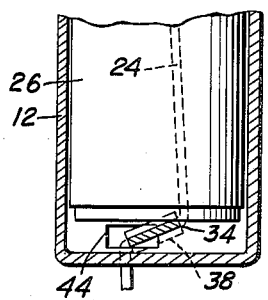
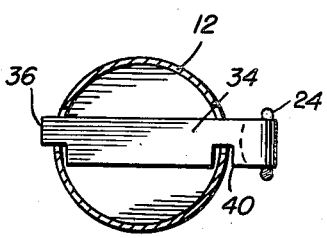
Inventor
Allen D. Robinson
By *Clarence A. O'Brien and Harvey B. Jackson*
Attorneys Patented Feb. 26, 1952

2,587,223

UNITED STATES PATENT OFFICE 2,587,223

SIGNAL LIGHT FOR FISHING LINES

Allen D. Robinson, Kenosha, Wis.

Application April 26, 1948, Serial No. 23,271

4 Claims. (Cl. 43—17)

This invention relates to a signal light for attachment to a fishing line and has for its primary object to illuminate the area surrounding the hook end of the line, responsive to a tension or pull on the line caused by the nibbling or bite of a fish on the bait.

Another object of this invention is to provide a novel signal light which is compact and inexpensive, and which is easily attached to a fishing line and serves to illuminate the area between the water and the fishing pole.

A meritorious feature of this invention resides in the provision of a tubular battery and bulb-retaining casing, and an operating lever mounted at one end thereof, the operating lever being easily attached to a line, and responsive to the tension produced thereon for advancing the battery into contact with the bulb.

These and ancillary objects and other meritorious features are attained by this invention, a preferred embodiment of which is set forth in the following description and illustrated in the accompanying drawings, wherein:

Figure 1 is a perspective view of a signal light, constructed in accordance with the principles of this invention;

Figure 2 is a vertical sectional view taken immediately through the light;

Figure 3 is a cross sectional view taken substantially on the transverse plane of line 3—3 of Figure 2; and Figure 4 is a vertical sectional view taken substantially along the plane of line 4—4 of Figure 2.

Referring now more particularly to the drawings, wherein similar characters of reference designate corresponding parts throughout, the numeral 10 generally designates this invention which comprises a tubular casing 12 having a closed end 14 and an open end 16. The open end 16 is suitably internally threaded, as at 18, for receiving a detachable transparent plastic cover or globe 20. The globe or plastic cover 20 has its open end reduced and exteriorly threaded for threaded engagement with the threaded end 18 of the casing. An integrally formed guide hook 22 extends from the top or closed portion of the cover and is adapted for attachment to a fishing line 24.

A conventional battery 26, such as a pen light battery or the like, is disposed in the casing 12. A conventional light bulb 28 is received in the globe or cover 20 with a spring 30 provided between the battery and the bulb. The spring 20 is received around the threaded end of the bulb and flares outwardly, terminating in an enlarged diametrical coil, which engages the inner sides of the casing and serves as a ground contact.

Disposed in the casing adjacent the closed end 14 thereof are transversely aligned openings or apertures 44. An operating lever 34 is mounted crosswise in the casing through the openings 44 and serves to advance the battery 26 into contact with the bulb 28, responsive to a tension or pull produced on the line 24 by a bite of a fish at the hook end or the like.

The operating lever 34 may be formed from any suitable material, such as a spring bar or the like, or may be formed from a strip of steel. A tongue 36 extends from one end of the body of the operating lever and is disposed through one of the apertures 44. The opposite end of the lever is bent back upon itself, defining a spring clamp 38, which is adapted to engage and clamp on the line 24. A semi-transverse groove or notch 40 is provided in the lever adjacent the clamp end 38 thereof. The cut-out portion 40 is adapted to be moved into engagement with and to receive the portion of the casing adjacent one of the apertures 44.

In operation, the signal light is attached to the line 24 by inserting the line into the split spring hook 22 and clamping the operating lever 34 to the line by means of the clamp 38. Upon a tension or pull being exerted on the line, the same will become taut thereby effecting partial rotation of the lever for movement against the end of the battery 26, causing the battery to move into contact with the bulb 28 (see Figure 4). The circuit is grounded by the spring 30 abutting against the inner sides of the casing 12. Upon a decrease of tension on the line, the spring 30 serves to bias the battery 26 from the bulb 28 and interrupts the circuit.

Thus, it can be seen that there is provided a simple and convenient device which may be easily and conveniently attached to a fishing line and which serves as an essential attachment for still fishing at night time.

However, since many other modifications and purposes of this invention will become readily apparent to those skilled in the art upon a perusal of the foregoing description, it is to be understood that certain changes in style, size and components may be effected without a departure from the spirit of the invention and within the scope of the appended claims.

Having described the invention, what is claimed as new is:

1. An illuminating device for fishing lines having hooks at one end thereof comprising a tubular casing, having a closed and an open end, a transparent cover detachably disposed on the open end of the casing, a battery in said casing, a bulb in the cover, resilient electric conducting means between one end of the battery and the bulb, an operating lever transversely mounted in the casing adjacent the other end of the battery, said lever being longitudinally movable in the casing, means on said lever for attachment to a line whereby said lever is axially rotatable in response to a tension on the hook end of a line for moving the battery into contact with the bulb.

2. An illuminating attachment for fishing lines comprising a tubular casing having a closed and an open end, a transparent member detachably received on the open end, a guide hook extending from said member, a battery disposed in the casing, a light bulb received in the member, said casing being formed adjacent the closed end with transversely aligned openings, an operating lever mounted in the openings for moving the battery into contact with the bulb, a clamp transversely disposed on said lever for attachment to a line whereby tensioning of the line effects axial rotation of the lever for engagement with the battery thereby reciprocating the same, and a spring disposed between the bulb and the battery for grounding the circuit when established by the lever and for biasing the battery from the bulb responsive to a decrease of tension on the line.

3. A signal light for fishing lines comprising a tubular casing having a closed end and an open end, aligned transverse openings in said casing adjacent the closed end, a transparent cover detachably disposed in the open end of the casing, a guide hook extending from said cover, a battery disposed in the casing, an illuminating lamp mounted in said cover, a ground contact resiliently connecting the lamp and battery, an operating lever transversely disposed in said openings adjacent the closed end of the casing, a clamp transversely disposed on said lever, and a line positioned for supporting the casing and being loosely received in said guide hook, a portion of said line being transversely disposed and clampingly held by said clamp, whereby tensioning of said line effects rotative movement of said lever about the longitudinal axis thereof thereby moving the battery upwardly for completing the electrical circuit for the lamp.

4. A signal light for fishing lines comprising a tubular casing having a closed end and an open end, aligned transverse openings in said casing adjacent the closed end, a transparent cover detachably disposed in the open end of the casing, a guide hook extending from said cover, a battery disposed in the casing, an illuminating lamp mounted in said cover, a ground contact resiliently connecting the lamp and battery, an operating lever transversely disposed in said openings adjacent the closed end of the casing, said lever having a pair of notches on a common edge of said lever and in juxtaposition to the periphery of said openings, a clamp transversely disposed on said lever, and a line positioned for supporting the casing and being loosely received in said guide hook, a portion of said line being transversely disposed and clampingly held by said clamp, whereby tensioning of said line effects rotative movement of said lever about the longitudinal axis thereof thereby moving the battery upwardly for completing the electrical circuit for the lamp.

ALLEN D. ROBINSON.

REFERENCES CITED

The following references are of record in the file of this patent:

UNITED STATES PATENTS

| Number | Name | Date |
| --- | --- | --- |
| 2,166,864 | Gelardin | July 18, 1939 |
| 2,195,692 | Bushey | Apr. 2, 1940 |
| 2,262,040 | Van Dyne Pell | Nov. 11, 1941 |
| 2,272,802 | High et al. | Feb. 10, 1942 |
| 2,280,457 | Sutcliffe | Apr. 21, 1942 |
| 2,349,077 | Comparelli | May 16, 1944 |
| 2,379,603 | Sullam | July 3, 1945 |